Nov. 11, 1930. J. STROBLE 1,781,608
VENTILATOR
Filed Sept. 9, 1927
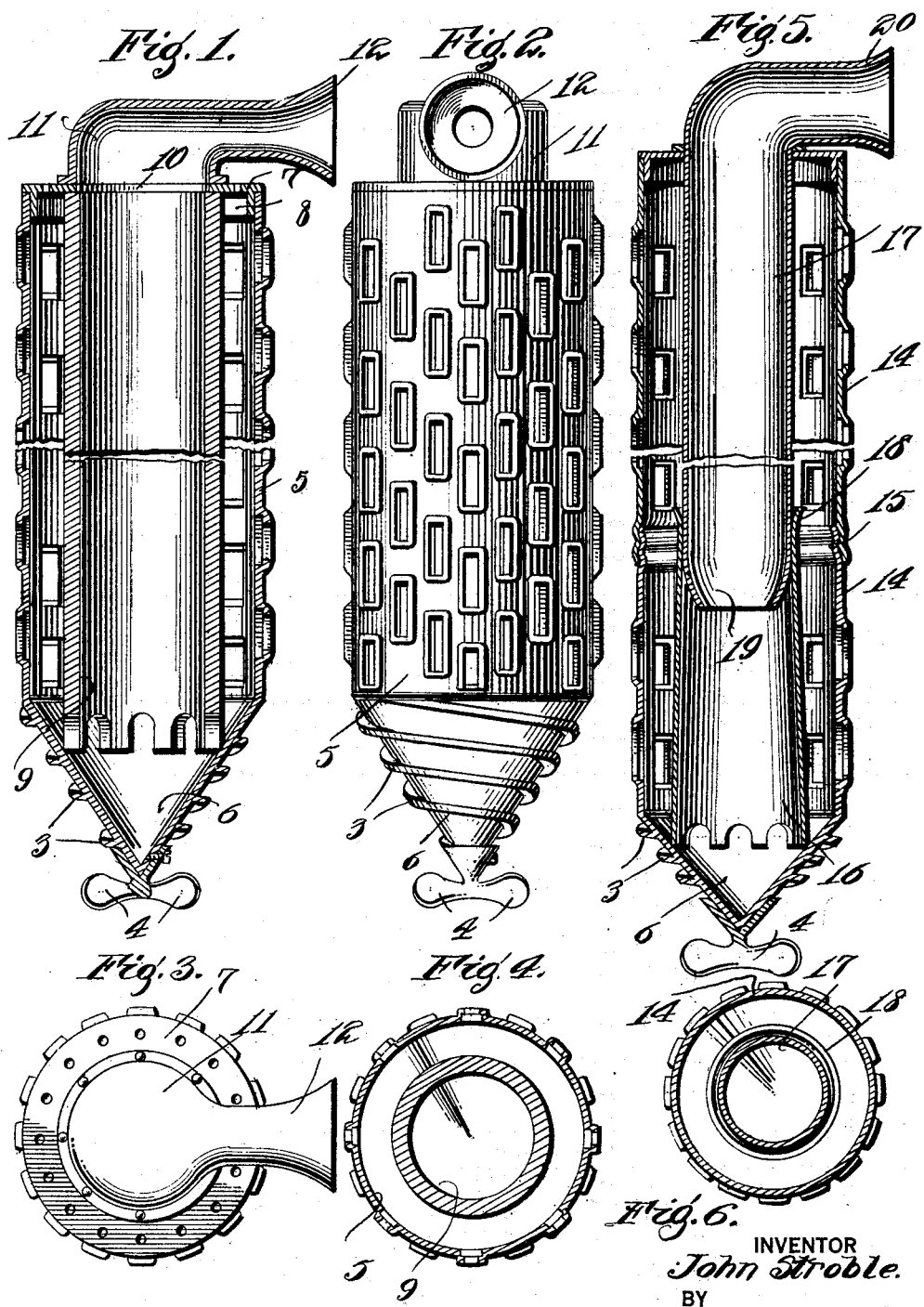
INVENTOR
John Stroble.
BY
ATTORNEY Patented Nov. 11, 1930

1,781,608

UNITED STATES PATENT OFFICE

JOHN STROBLE, OF SEWARD, KANSAS; ELLA STROBLE ADMINISTRATRIX OF SAID JOHN STROBLE, DECEASED

VENTILATOR

Application filed September 9, 1927. Serial No. 218,505.

My invention relates to ventilators and more particularly to grain ventilators.

An object of the invention is to provide a grain ventilator wherein heat from the grain is utilized to create a natural draft of cool air to the grain and thus conduct condensation from the grain.

Another object of the invention is to provide a device of this character having a maximum ventilating area and when in use may be inserted in the grain in vertical or angular positions.

The invention also contemplates a grain ventilator embodying a moisture absorbing element to absorb the products of condensation as they are drained from the grain.

With the preceding and other objects and advantages in mind, the invention consists in the novel combination of elements, constructions, and arrangement of parts to be hereinafter specifically referred to, claimed, illustrated in the accompanying drawings, wherein:

Figure 1 is a vertical sectional view of the invention;

Figure 2 is a side elevation of the same;

Figure 3 is a top plan view;

Figure 4 is a horizontal sectional view of Figure 1;

Figure 5 is a vertical section of a modification of the invention, and

Figure 6 is a horizontal sectional view of Figure 5.

In both embodiments of the invention, the principle of operation is the same, but in the embodiment of the invention illustrated in Figure 1, a moisture absorbing element is employed to absorb the moisture from the grain as it is drawn therefrom.

Referring to the invention disclosed in Figures 1 to 4, inclusive, a cylindrical foraminated casing 5 to be submerged in a body of grain is provided. As illustrated in Figure 2, the openings or foraminations in the casing are elongated and arranged in staggered relation.

To facilitate the entrance of the casing into the grain, its lower end 6 is tapered and formed with spiral parallel ribs 3, which merge into oppositely inclined blades 4 formed at the apex of the tapered end 6. It will be observed that upon rotation of the casing the blades 4 and ribs 6 coact to draw the casing into the grain.

To permit the escape of hot air conducted into the casing from the grain, a removable foraminated cap 7 is provided for the upper end of the casing. The cap 7 is formed with a depending annular flange 8 which is received within the casing.

In order to conduct atmospheric air into the casing and cause a circulation or natural draft therein to the atmosphere and thereby draw the hot air from the grain, a tubular conduit 9 extending concentrically within the casing with its inner end resting upon the tapered end 6 and its opposite end registering with a central opening 10 in the cap 7, is attached to the under face of the cap in any suitable manner. This conduit 9 is formed of porous or moisture absorbing material, so as to absorb the moisture as it is drawn from the grain incident to the circulation of air through the device.

For the purpose of directing natural air currents into the air conduit, a bowl shaped air collector 11 is attached to the cap which overlies the central opening therein and is provided with a laterally extending cowl or flared air inlet 12.

In the modification disclosed in Figure 5, the casing 5 is formed of upper and lower sections 14 having threaded engagement as at 15, each of which carries telescopic air conduit sections 16 and 17.

To facilitate engagement of these sections when assembling the casing sections, the conduit section 16 has its upper end flared as at 18, while the lower end of the other section is tapered as at 19. In this instance the bowl shaped member is eliminated and in lieu thereof the upper end of the conduit section 17 is formed with a right angular flared branch or cowl 20 for conducting natural air into the device. In use the device is arranged in the grain with the cowl above the latter. Fresh air entering the cowl passes downwardly through the inner conduit as disclosed in Figs. 1 and 5. From the lower end or the inner conduit, the fresh air passes upwardly between the casing and conduit. As the fresh air travels upwardly it is distributed through the grain by way of the perforations in the casing to ventilate the grain.

What is claimed is:

In a grain ventilator a pair of foraminated casing sections having interfitting detachable connection, a cap removably received in the upper end of one of the sections and provided with a central opening, a conduit section arranged centrally in the lower casing section and having outlets at its lower end and having its upper end flared, a second conduit section arranged in the other casing section and having one end extended through the central opening in the cap and attached to the latter, the lower end of said conduit section being tapered to facilitate engagement with the flared end of the first mentioned conduit section.

JOHN STROBLE.